United States Patent [19]

Offermann et al.

[11] B 4,015,051

[45] Mar. 29, 1977

[54] POLYETHYLENE PACKAGING FILM

[75] Inventors: Richard A. Offermann, Countryside; Robert J. Vorrier, Palos Hills, both of Ill.

[73] Assignee: Union Carbide Corporation, New York, N.Y.

[22] Filed: Apr. 24, 1974

[21] Appl. No.: 463,591

[44] Published under the second Trial Voluntary Protest Program on March 30, 1976 as document No. B 463,591.

[52] U.S. Cl. .................. 428/523; 53/30 S; 427/385 B; 428/483

[51] Int. Cl.$^2$ ............. B32B 27/32; B06D 3/02

[58] Field of Search .......... 117/93.1 CD, 138.8 E, 117/138.8 F, 161 K; 427/385; 428/483, 523

[56] References Cited

UNITED STATES PATENTS

| | | | |
|---|---|---|---|
| 2,828,237 | 3/1958 | Rosser | 154/139 |
| 3,013,914 | 12/1961 | Willard | 154/43 |
| 3,027,343 | 3/1962 | Kane | 260/33.6 |
| 3,036,930 | 5/1962 | Grimminger et al. | 117/93 |
| 3,043,716 | 7/1962 | Busse et al. | 117/132 |
| 3,188,265 | 6/1965 | Charbonneau et al. | 161/188 |
| 3,277,040 | 10/1966 | Barkis et al. | 260/29.6 |
| 3,279,940 | 10/1966 | Francis et al. | 117/94 |
| 3,282,729 | 11/1966 | Richardson et al. | 117/138.8 |
| 3,442,686 | 5/1969 | Jones | 117/70 |
| 3,481,891 | 12/1969 | Boylan et al. | 260/21 |
| 3,629,360 | 12/1971 | Burkhart | 260/829 |
| 3,639,134 | 2/1972 | Stegmeier et al. | 117/7 |
| 3,829,324 | 8/1974 | Blais et al. | 117/47 A |
| 3,887,579 | 6/1975 | Brunet et al. | 264/316 |

FOREIGN PATENTS OR APPLICATIONS

| | | |
|---|---|---|
| 545,406 | 8/1957 | Canada |
| 1,078,813 | 8/1967 | United Kingdom |
| 812,448 | 4/1959 | United Kingdom |

*Primary Examiner*—P.E. Willis, Jr.
*Attorney, Agent, or Firm*—Franklyn Schoenberg

[57] ABSTRACT

A transparent, flexible thermoplastic film having a coating comprising a film-forming polyester resin on a surface thereof is provided, said resin coated surface being readily separable from contiguous surfaces of thermoplastic film after heating at temperatures employed in heat-shrinking thermoplastic film. The resin coated film is particularly suitable for use in preparing stable pallet loads wherein the resin coated film surfaces make possible the ready disassembly of the pallet load without damage to any packaging film used in preparing articles for loading on a pallet.

8 Claims, No Drawings

POLYETHYLENE PACKAGING FILM

This invention relates to stable pallet loads and more particularly to an improved method of preparing stable pallet loads using heat-shrinkable polyethylene pallet wrapping film.

A number of pallet loading techniques are used commercially for the storage and shipment of large quantities of a wide variety of products. Heretofore relatively time consuming procedures were required for arranging articles on pallets and for stabilizing the pallet load to prevent shifting or other problems that may cause damage to the packaged articles. In recent years the use of various types of overwrapping materials, and particularly heat-shrinkable thermoplastic film overwraps, that closely envelop the pallet load have been widely accepted because of the ease with which the load can be assembled and disassembled, the effectiveness found in stabilizing the pallet load and protection generally afforded the assembled articles. In addition, the use of transparent film materials affords a means for readily viewing and identifying the products assembled on the pallet.

It has been found, however, that temperatures used for shrinking overwrapping film such as blown, lowdensity polyethylene causes the film to adhere or fuse to certain types of materials used for packaging the products assembled on the pallet resulting in damage to or destruction thereof upon removal of the pallet overwrap. Accordingly, there is clearly a need to provide an economical way for eliminating adhesion between the pallet overwrapping materials and packaging materials used for articles that may be loaded on the pallet, and preferably one that does not detrimentally affect the transparency or other desirable properties of the packaging materials.

In accordance with the present invention there is provided transparent, flexible, thermoplastic film having a thin, transparent coating applied, and preferably adhered, to at least one surface thereof said coating comprising a film-forming polyester polymer solution resin, said resin coated surface being readily separable from contiguous surfaces of thermoplastic film after heating at temperatures employed in heat-shrinking thermoplastic film.

There is also provided an improved method of preparing a stable pallet load wherein a plurality of articles individually packaged in flexible, thermoplastic film are assembled in a substantially abutting array on a pallet, overwrapping said pallet load with a heat-shrinkable thermoplastic film and then heating said overwrapping film to shrink the same about said loaded pallet to retain and hold firmly the articles arranged thereon, the improvement which comprises employing flexible, thermoplastic film materials having a thin, transparent coating comprising a film-forming polyester solution coating resin applied to at least one surface thereof to provide a thermoplastic film surface that is readily separable from a contiguous thermoplastic film surface after heating at a temperature employed in heat-shrinking thermoplastic film.

The present invention is based on the discovery that a flexible, transparent, heat-shrinkable, thermoplastic film coated with a film-forming polyester polymer solution coating resin as herein described may be heated at temperatures suitable for heat-shrinking said film without affecting the transparency or flexibility of the film material and the polyester resin coated film surface will be readily separable from contiguous thermoplastic film surfaces. Further, it has been found that whereas the polyester resin coated film surface may be readily separable from contiguous thermoplastic film surfaces, the resin coated film surface exhibits "low-slip" or "non-skid" characteristics, reducing the possibility of packaged articles unduly "slipping" or "skidding" when assembled on a pallet. Other coating materials, such as nitrocellulose, cellulose acetate butyrate, polyamide resins and acrylic resins, evaluated as coating material for heat-shrinkable thermoplastic film have been found to exhibit satisfactory release characteristics from contiguous thermoplastic film surfaces. These coating materials, however, were found to become cloudy after heating at heat-shrinking temperatures, thereby inhibiting the transparency of the coated film and generally limiting its suitability for most commercial applications.

Accordingly, when a polyester resin coated thermoplastic film of the present invention is, for example, employed either as the packaging material for articles loaded on a pallet or as a heat-shrinkable thermoplastic pallet overwrap film for preparing a stable pallet load, and the resin coated surface thereof is used so as to contact associated film materials, the stability of the pallet load is generally enhanced by the "non-skidding" characteristics of the resin coated film, yet the pallet load may be readily disassembled without damaging the packaged articles. In addition, the film transparency is not affected by the resin coating during the heat-shrink operation, permitting viewing of the packaged articles and ready identification thereof while assembled on the pallet.

Flexible, transparent thermoplastic film materials prepared by any one of the methods well known in the art are suitable for use as the film of the present invention. Low-density polyethylene film that exhibits heat-shrinking properties, such as "slot-cast", "blown" or "biaxially oriented" polyethylene film, is a typical preferred film that has been advantageously employed for "bundle-wrap" and/or "pallet overwrap" applications.

Polymer coating materials that are suitable for use in preparing the thermoplastic films of the present invention are film-forming polyester resins such as thermoplastic, linear, saturated polyester polymers that are soluble in a number of different solvents and may be readily applied from solution. Exemplary suitable film-forming polyester resins are the solution type thermoplastic polyester copolymer resins available commercially from E. I. DuPont De Nemours & Co. (Inc.) and the "VITEL" brand of polyester solution resins commercially available from the Goodyear Chemical Division, The Goodyear Tire & Rubber Company.

One method of coating the flexible, transparent thermoplastic film, and particularly blown, low-density polyethylene film, with film-forming polyester resin is by preparing a solution of the polyester resin in suitable solvent, as, for example, a 10% by weight resin solution in 2-nitropropane and then applying the resin solution by flexographic printing techniques. When improved bonding of the coating to the film surface is desired, it is generally necessary to treat the polyethylene surface to be coated with a corona discharge treatment, as, for example, disclosed in U.S. Pat. No. 3,391,070. The resin coated film, after drying, may then be employed as herein disclosed.

Alternatively, any one of a number of methods well known in the art may also be used to coat flexible thermoplastic film with film-forming polyester resin, as, for example, gravure printing, spraying, dip coating, doctor-knife coating and the like.

The amount of film-forming polyester resin that is needed to prevent adhesion or fusion of contiguous film surfaces can vary over a wide range, though it has been found that very small quantities are actually required. In general, when a continuous coating is to be applied to the film surface, at least about 0.081 gms per sq. meter (0.05 lbs. per ream) and preferably between about 0.16 gms and 0.325 gms of polyester resin per sq. meter of film surface should be applied. Greater amounts of the film-forming polyester resin may be used, if desired, although generally it will not improve the release characteristics of the thermoplastic film and a quantity greatly in excess of that needed may adversely affect the flexibility, economics and other desirable characteristics of the film.

The thermoplastic film of the present invention may, of course, be coated over the entire surface thereof or pattern coated if desired. It has been found that the presence of the film-forming polyester resin on the surface of thermoplastic film will inhibit heat sealing the film. Accordingly, when it is desired to heat seal multi-ply layers of the film to form various types of articles, such as containers, it will be necessary to avoid coating the area of the film in which heat seals are to be formed. The use of flexographic coating techniques for applying the film-forming polyester resin are especially useful in controlling the area of film to be coated.

The invention is further illustrated by the following examples which are set forth as being merely illustrative of the invention and which are not intended, in any manner, to be limitative thereof. Unless otherwise indicated, all parts and percentages are by weight.

EXAMPLE 1

A 3 mil thick blown, low density polyethylene film treated on one side by corona discharge treatment was advanced through a flexographic printing press where a 10 per cent by weight solution of a linear, saturated polyester polymer in 2-nitropropane was continuously applied to the corona treated surface of the film. The apparatus was adjusted to provide a coating of 0.215 gms of resin per sq. meter of film. The coated film was then passed through a drier at 120°F. to evaporate the solvent. The linear saturated polyester polymer used in this example was purchased under the trademark VITEL PE-222 from the Goodyear Chemical Division, The Goodyear Tire & Rubber Co.

One dozen soft drink bottles arranged in 3 rows of 4 bottles on a corrugated paper-board tray were shrink-wrapped with the polyester resin coated film with the coated film surface facing outwardly. The ends of the film wrapping were joined to form a sleeve about the array of bottles and then heat shrunk in a heat tunnel for 5 seconds at 350°F. Eighty wrapped packages of bottles were prepared as above using the polyester resin coated film of this example.

The 80 packages of bottles were arrayed on pallets with 4 packages of bottles per layer stacked 5 layers high. Each pallet load containing 20 packages of bottles was enveloped with a bag formed from 6 mil thick blown, low-density polyethylene film and then advanced through a heat tunnel for 40 seconds at 350°F. to shrink the pallet overwrap film about the pallet load.

As a control and for comparison purposes, a pallet load was prepared containing 20 packages of bottles, each package of bottles containing one dozen soft drink bottles as above that were enveloped in a heat-shrunk, 3 mil blown, low-density polyethylene film. A 6 mil blown, low-density polyethylene film bag was used to overwrap the pallet load of 20 packages of bottles and advanced through a heat tunnel for 40 seconds at 350°F. to shrink the pallet overwrap film.

The bottles packaged with polyester resin coated polyethylene film could be readily viewed through the overwrapping film, there being no loss in transparency of the film.

The pallet load prepared with packages of bottles made with the polyester resin coated film was readily disassembled without damage to any of the packaging film. The pallet film outer overwrap of the control pallet load, however, could not be readily removed from the pallet load, there being numerous instances of fusion of the overwrapping film to the bottle packaging film. When the overwrapping film was finally removed from the control load, a great deal of the bottle packaging film was damaged.

EXAMPLE 2

Beverage bottles arranged in 2 rows of 3 bottles are enveloped with a 1.5 mil thick blown, low-density, heat-shrinkable polyethylene film (Film A) and heat shrunk into a six-pack unit. Four six-pack units of the bottles are placed on a paper-board tray in 2 rows of 2 which are then enveloped with a 3 mil thick polyester resin coated blown, low-density, heat-shrinkable polyethylene film (Film B) with the resin coated film surface facing inwardly, and heat shrunk into case-packs (24 bottles) by passing through a heat tunnel for 40 seconds at 350°F.

Twenty case-packs of the above film-enveloped bottles are tightly stacked in abutting relationship on a pallet in 5 layers of 4 case-packs each, to comprise a pallet load. The entire pallet load is then over-wrapped with a 6 mil thick blown, low-density, heat-shrinkable polyethylene film (Film C) coated on one surface (the surface contiguous to the outer surface of film B) with a polyester coating solution and then heat shrunk as above. A 10% solution of "VITEL PE-207" in 2-nitropropane is used to coat the 3 mil and 6 mil thick polyethylene films of this example (Films B and C, respectively) with about 0.215 gms per sq. meter of film surface being applied thereto. VITEL PE-207 is the trademark of a linear, saturated polyester polymer resin purchased from the Goodyear Chemical Division, The Goodyear Tire & Rubber Co.

Transparency of the films A, B and C is maintained throughout the successive heat shrink operations, from six-pack unit through the case-pack packaging and pallet overwrapping. When necessary to dismantle the pallet overwrap (Film C), it is readily releasable from the palletized case packs. Also, when the case-pack film (Film B) is removed, it releases readily from the enclosed six pack.

What is claimed is:

1. A transparent, flexible thermoplastic polyethylene packaging film having a thin transparent coating consisting essentially of a film-forming polyester resin applied to at least a portion of one surface thereof in an amount of at least 0.081 gms. of polyester resin per sq. meter of film and not more than an amount which would affect the transparency and flexibility of said film, said resin coated surface remaining transparent and being readily separable from contiguous surfaces of thermoplastic film after heating at temperatures employed in heat-shrinking thermoplastic film.

2. The film of claim 1 wherein said thermoplastic film is a heat-shrinkable polyethylene.

3. The film of claim 2 wherein said heatshrinkable polyethylene is a blown low-density polyethylene.

4. The film of claim 1 wherein said filmforming polyester resin is a thermoplastic linear saturated polyester polymer.

5. A process for preparing a transparent, flexible thermoplastic film that remains transparent and is readily separable from contiguous surfaces of thermoplastic film after heating at temperatures employed in heat-shrinking thermoplastic film comprising the steps of applying to at least a portion of one surface of a transparent, flexible thermoplastic film a coating composition comprising a transparent film-forming polyester resin in an amount of at least 0.081 gms of polyester resin per sq. meter of film and not more than an amount which would affect the transparency and flexibility of said film and then drying said coated film.

6. A process according to claim 5 in which said thermoplastic film is a heat-shrinkable polyethylene.

7. A process according to claim 5 in which said polyester resin is a thermoplastic linear saturated polyester polymer.

8. A process according to claim 5 in which said polyester resin coating composition is applied to the surface of said thermoplastic film using flexographic printing means.

* * * * *